United States Patent [19]

Kojima

[11] 4,433,415
[45] Feb. 21, 1984

[54] PCM SIGNAL PROCESSOR

[75] Inventor: Tadashi Kojima, Yokosuka, Japan

[73] Assignee: Tokyo Shibaura Denki Kabushiki Kaisha, Japan

[21] Appl. No.: 300,737

[22] Filed: Sep. 10, 1981

[30] Foreign Application Priority Data

Sep. 16, 1980 [JP] Japan ................. 55-128332

[51] Int. Cl.³ ............................................ G06F 11/10
[52] U.S. Cl. ...................................... 371/37; 360/32; 371/38; 371/40
[58] Field of Search ........................... 371/38, 40, 37; 360/38.1, 32, 53

[56] References Cited

U.S. PATENT DOCUMENTS

| | | | |
|---|---|---|---|
| 4,211,997 | 7/1980 | Rudnick et al. | 371/38 |
| 4,227,221 | 10/1980 | Kanazawa | 360/32 |
| 4,238,852 | 12/1980 | Iga et al. | 371/40 |
| 4,282,551 | 8/1981 | Kanazawa et al. | 360/32 |
| 4,306,305 | 12/1981 | Doi et al. | 371/38 |
| 4,309,721 | 1/1982 | Christopher | 358/128.5 |
| 4,371,270 | 1/1983 | Yamada | 371/38 |

FOREIGN PATENT DOCUMENTS 29226 11/1980 European Pat. Off. .
2019168 4/1979 United Kingdom .

OTHER PUBLICATIONS

Doi et al., A Long-Play Digital Audio Disk System, Journal of the Audio Eng. Soc., 1979, Dec., vol. 27, No. 12, pp. 975-981.
Patent Abstracts of Japan, vol. 5, No. 118, pp. P073, 790, (Jul. 30, 1981), Japanese Pat. No. 56-58115.
Ishida et al., "A Rotary-Head PCM Recorder Employing Error Correction Technique," IEEE Transaction on Consumer Electronics, vol. CE-24, No. 4, pp. 526-533, (Nov. 1978).
"Consumer Use PCM Encoder-Decoder 1979-6" Journal of Audio Engineering Society, vol. 28, No. 4, pp. 260-265, (Apr. 1980).
Patent Abstracts of Japan, vol. 4, No. 90, P17 572, (Jul. 27, 1980), Japanese Pat. No. 55-52515.

Primary Examiner—Charles E. Atkinson
Attorney, Agent, or Firm—Finnegan, Henderson, Farabow, Garrett & Dunner

[57] ABSTRACT

A pulse code modulation signal processor extracts data words from a serial data stream. The signal processor includes a serial-to-parallel converter to convert the data stream into parallel data words, a de-interleave circuit to add different delays, and thus synchronize with each other, the extracted data words, a circuit for forming an error pointer from the data words, an error pointer comprising data word error pointers each indicating the presence of an error in a different data word, an error pointer shift register for synchronizing the error pointer with the data words from the de-interleave means, and an error detector and corrector.

6 Claims, 9 Drawing Figures

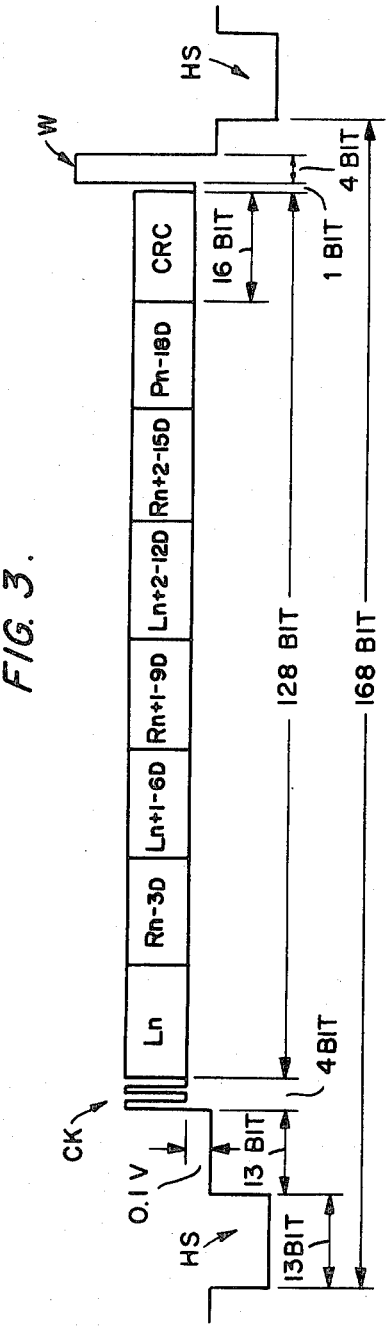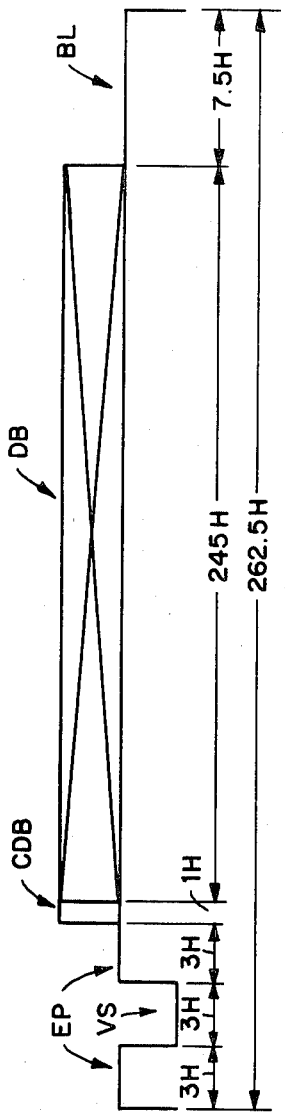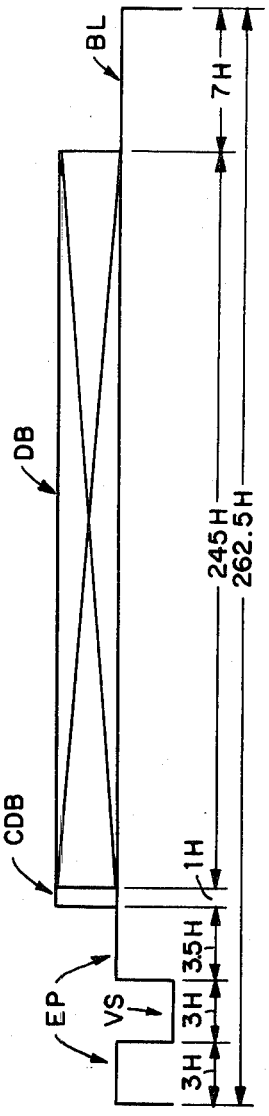

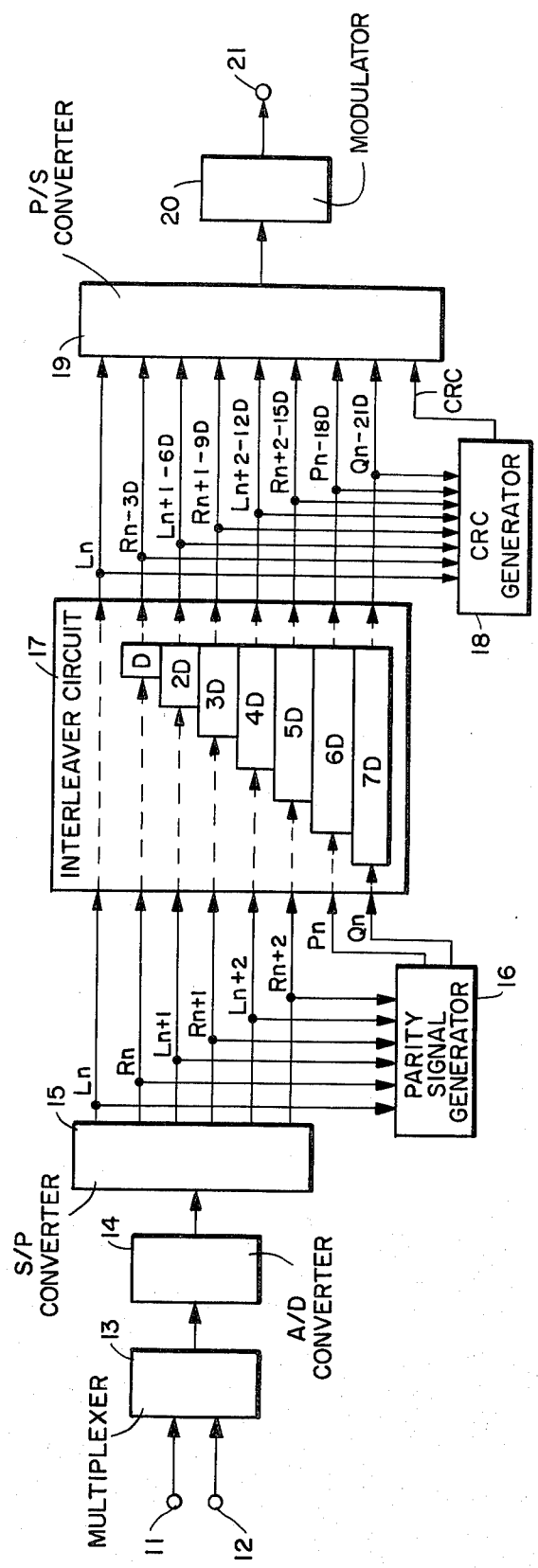
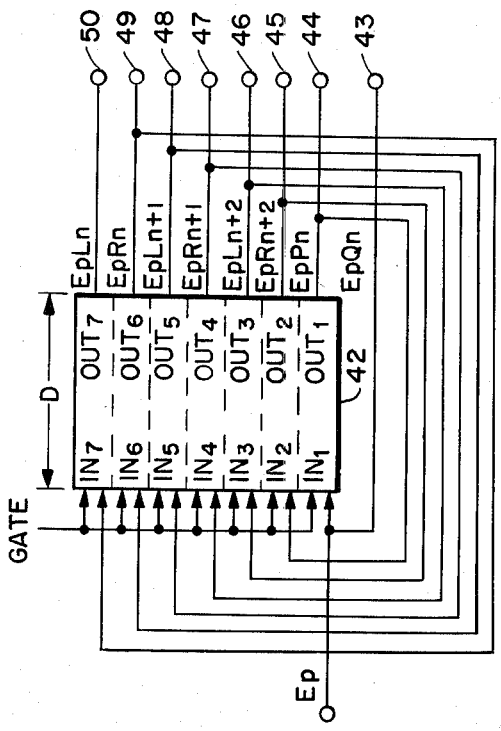
FIG. 5.
FIG. 8.

PCM SIGNAL PROCESSOR

FIELD OF THE INVENTION

This invention relates to a PCM (pulse code modulation) signal processor, and more particularly, to a PCM signal processor for a PCM audio signal decoder used with a VTR (video tape recorder).

BACKGROUND OF THE INVENTION

In the field of audio engineering, digital technology has been used most often in the design of professional equipment. Recently, consumer video cassette tape recorders have incorporated digital technology and movement toward the use of digital data in consumer audio equipment appears to be accelerating.

A major reason for this trend is that the PCM recording and playback system, which is made possible by combining a video tape recorder (VTR) and digital technology, has a much broader dynamic range than do conventional analog tape recorders. Another reason is that in comparison with those conventional recorders, the PCM system has practically no wow and flutter. Also, the frequency distortion characteristics of the PCM system are substantially superior to those of analog systems.

A PCM audio system connected to a VTR requires a digital signal processor to transform the PCM signal format to and from the appropriate television signal format. The format for the PCM audio signal may be the one prescribed by the EIAJ (Electronic Industries Association of Japan) Technical File: STC-007, which employs bit error correction schemes together with interleaving techniques. This format will be described in detail below.

The PCM audio signals are encoded in the EIAJ format for the VTR by delaying the interleaving of the data words and by adding both an error correction check word and an error detection check word. Conventional PCM signal processors for decoding the encoded PCM audio signals must include de-interleave circuits having exceedingly large storage capacities.

SUMMARY OF THE INVENTION

It is, therefore, an object of the present invention to reduce the required storage capacity of the de-interleave circuit in a PCM signal processor.

According to the present invention, the PCM signal processor for extracting data words from a serial PCM data block also containing an error detection and correction code comprises: serial-to-parallel converter means for converting the serial PCM data block into a parallel format, the serial-to-parallel converting means having terminals each outputting in parallel a different one of the data words or the error detection and correction code; de-interleave means connected to the terminals of the serial-to-parallel converter means for adding different delays to the data words such that all of the data words appear synchronously at the output of the de-interleave means; means connected to the terminals of the serial-to-parallel converter means for forming an error pointer from the data words and the error detection and correction code, the error pointer comprising data word error pointers each indicating the presence of an error in a different data word; an error pointer shift register for synchronizing the error pointer with the de-interleave means such that each data word error pointer is synchronized with its corresponding data word; and means for detecting and correcting errors in the data words using said error pointer.

Additional objects and advantages of the present invention will become apparent to persons skilled in the art from the following detailed description and the accompanying drawings.

BRIEF DESCRIPTION OF THE DRAWINGS

FIG. 3 shows another type of word signal allocation for a horizontal scanning period;

FIG. 4A shows a signal allocation for an odd vertical field of a TV signal;

FIG. 4B shows a signal allocation for an even vertical field of a TV signal;

FIG. 5 shows a block diagram of an encoder for transforming PCM audio signals to VTR format signals;

FIG. 8 shows a detailed circuit diagram of the error pointer delaying circuit shown in FIG. 7.

DESCRIPTION OF THE PREFERRED EMBODIMENT

The present invention will be described in detail with reference to the accompanying drawings FIG. 1 to FIG. 8. Throughout the drawings, like reference letters and numerals will be used to designate like or equivalent elements.

Before describing the invention, it is necessary to describe the EIAJ signal format. This will be done by referring to FIG. 1 through FIG. 4B.

When PCM encoding analog audio signals, two channels of stereophonic analog signals (L and R) are individually sampled at about 44 kHz. Each sample becomes a 14-bit or 16-bit PCM data word in a video signal portion of the standard television (TV) signal.

Figure 1:
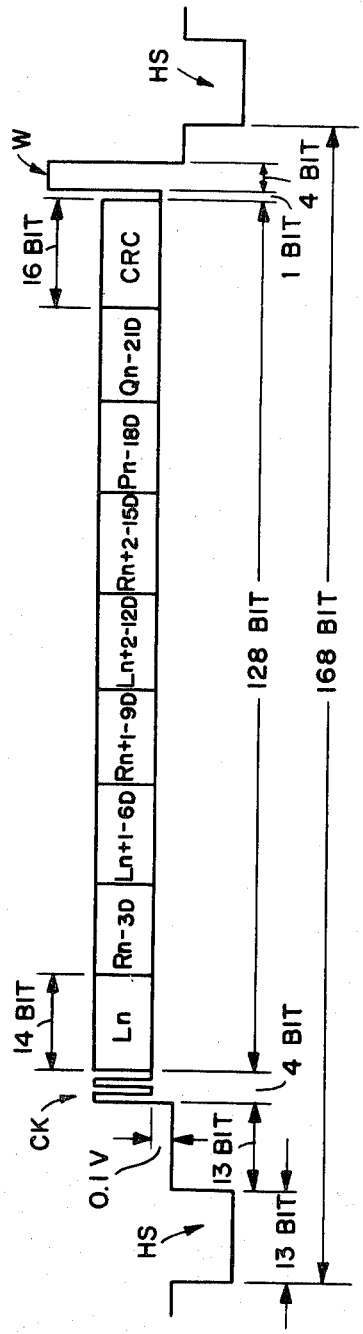
FIG. 1 shows one type of word signal allocation according to the EIAJ format for a horizontal line of scanning period of a TV signal.

FIG. 1 shows an example of a waveform and data format of one horizontal scanning period (1 H period) when the sample becomes a 14-bit data word. Each video signal block in a single horizontal line contains six PCM data words (three data words per channel: $L_n$, $R_n-3D$, $L_n+1-6D$, $R_n+1-9D$, $L_n+2-12D$ and $R_n+2-15D$) with two check words ($P_{n-18D}$ and $Q_{n-21D}$) for error correction, and one CRC word for error detection. These words form a 9-word, 128-bit data block (DB) for each horizontal scanning period.

The CRC word consists of 16 bits, but all other words are 14 bits. The PCM data words shown in FIG. 1 as L and R correspond respectively to the left and right channels of the sampled data. The suffixes represent the number of the sample in the sampling order.

In the format shown in FIG. 1, the data is interleaved such that each data word, i.e., the six PCM data words and the two check words are successively shifted 16 blocks (or equivalently 16 horizontal lines). The letter D in the suffixes of the sample data words in FIG. 1 represents both the number of blocks of the interleave and the equivalent amount of time necessary to transmit that number of blocks. In this case, the number of blocks of the interleave is 16, which is equivalent to a word-interleave of 3D=48 words.

The horizontal line (1H) in FIG. 1 is 168 bits long. This 168-bit line comprises a 13-bit long horizontal sync signal HS, followed by an interval of 13 bits, then a 4-bit clock signal CK for synchronization of data. The code of the data synchronization signal CK is "1010." The 128-bit data block described above is next, followed by a single bit representing a "0," a white reference signal W of 4 bits and a 5-bit long null signal.

Figure 2:
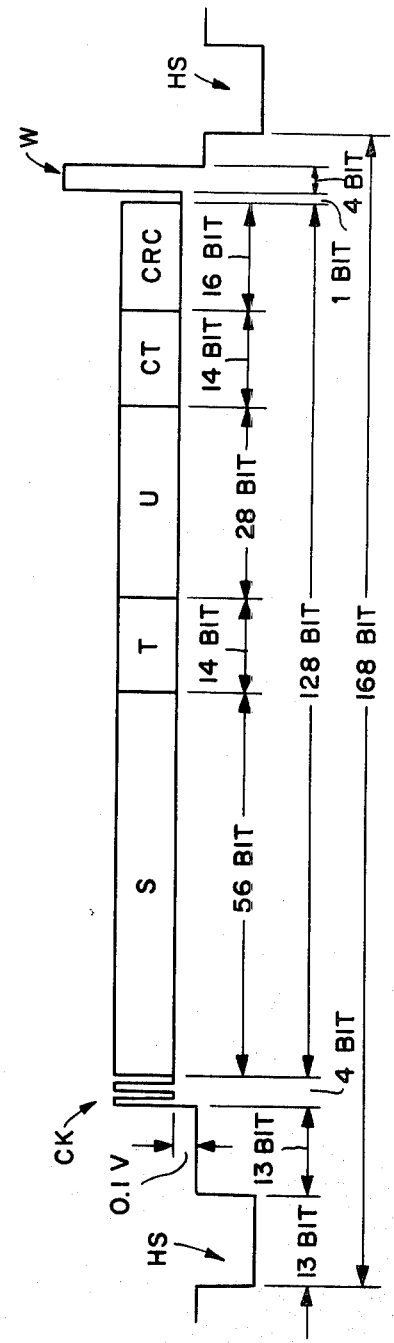
FIG. 2 shows a control signal allocation for a horizontal scanning period.

FIG. 2 shows a 1H horizontal line contaning a control signal data block (CDB). This format is the same as that of FIG. 1 except the 128-bit data block in FIG. 1 is replaced by a 128-bit control data block. The 128-bit control data block in this case comprises a 56-bit heading signal word S, a 14-bit content discrimination signal word T, a 28-bit address signal word U, a 14-bit control signal word CT, and the previously mentioned 16-bit CRC error detection word.

The content of the 14-bit control signal word CT is shown in Table 1.

TABLE 1

| Bit No. | Code Content | Control content | Bit content |
|---|---|---|---|
| 1 to 10 | No prescription | — | 0 |
| 11 | Dubbing inhibition code | Absent | 0 |
| 12 | P correction discrimination code | Present | 0 |
| 13 | Q correction discrimination code | Present | 0 |
| 14 | Pre-emphasis discrimination code | Present | 0 |

In Table 1, the Q correction discrimination code is "0" representing "presence" when each word of the PCM audio signal is 14 bits as shown in FIG. 1. When each word comprises 16 bits, the data format shown in FIG. 3, the Q correction discrimination code is "1" representing "absence."

FIG. 3 shows an example of the data block in which each sample data word of the PCM audio signal is 16 bits. In this case, the 128-bit data block comprises six 16-bit words (three left and three right channel audio signals), a 16-bit error correction word P and a 16-bit CRC error detection word, for a total of eight words.

The above data signals for 1H horizontal lines are arranged in a vertical scanning field as shown, for example, in FIGS. 4A and 4B. FIG. 4A corresponds to an odd field and FIG. 4B corresponds to an even field.

Each field begins with an equivalent pulse EP, a vertical sync signal VS, and another EP. The control signal block CDB (see FIG. 2) is the 10th horizontal line in the odd field (see FIG. 4A) and the 10.5th horizontal line in the even field (see FIG. 4B). After the CDB, there are 245 horizontal lines (see FIGS. 1 and 3) in the data block DB. The remaining horizontal lines constitute a blank period BL.

Of the 262.5 horizontal lines constituting one vertical field in FIGS. 4A and 4B, the 16.5 lines which do not contain the control signal block CDB or one of the 245 lines in the data block DB correspond to the vertical blanking period of the standard television signal.

FIG. 5 is a block diagram of an encoder for converting the analog audio signals into the interleaved PCM data format signals for the data block of the horizontal line shown in FIG. 1.

The analog audio signals from the left and right channels are inputted through input terminals 11 and 12 into multiplexor 13. Multiplexor 13 alternately samples the left and right audio signals at a sampling frequency of about 44 kHz. Each sampled signal from multiplexor 13 is then routed to analog-to-digital converter (hereinafter "A/D converter") 14 where the sampled signals are converted into PCM signal data words (hereinafter "data words"). In the encoder shown in FIG. 5, each data word has 14 bits.

The data words from A/D converter 14 are then inputted to serial-to-parallel converter (hereinafter "S/P converter") 15 where they become individual words: $L_n$, $R_n$, $L_{n+1}$, $R_{n+1}$, $L_{n+2}$ and $R_{n+2}$. Each individual data word is outputted from a different output terminal.

These data words are applied to parity signal generator 16 which generates check words P and Q in accordance with operations for those data words. The six data words, $L_n$ through $R_{n+2}$, and the two check words, P and Q, are applied to interleave circuit 17 which comprises several delay circuits. Data word $L_n$ is not delayed as it passes through interleave circuit 17 but the other five data words, $R_n$, $L_{n+1}$, $R_{n+1}$, $L_{n+1}$ and $R_{n+2}$, and the two check words, P and Q, are delayed by different amounts equal to times D through 7D, respectively. D was defined above as the time necessary to transmit the number of blocks in the interleave. Words $L_n$ through $Q_{n-21D}$ outputted from interleave circuit 17 are applied to error detection check word generator (hereinafter "CRC generator") 18 which generates a CRC check word for error detection of data words $L_n$ through $Q_{n-21D}$.

The eight interleaved words $L_n$ through $Q_{n-21D}$ from interleave circuit 17, plus the CRC check word from CRC generator 18, are converted into a single-line, time-shared signal by parallel-to-serial converter (hereinafter "P/S converter") 19.

The output of P/S converter 19 is applied to TV signal modulator 20 which converts the single-line, time-shared signal into a proper TV signal format which is then sent to VTRs (not shown) via output terminal 21. This format is represented by the data block shown in FIG. 1, which includes the six data words $L_n$ through $R_{n+2-15D}$ and the three check words $P_{n-18D}$, $Q_{n-21D}$ and CRC.

Figure 6:
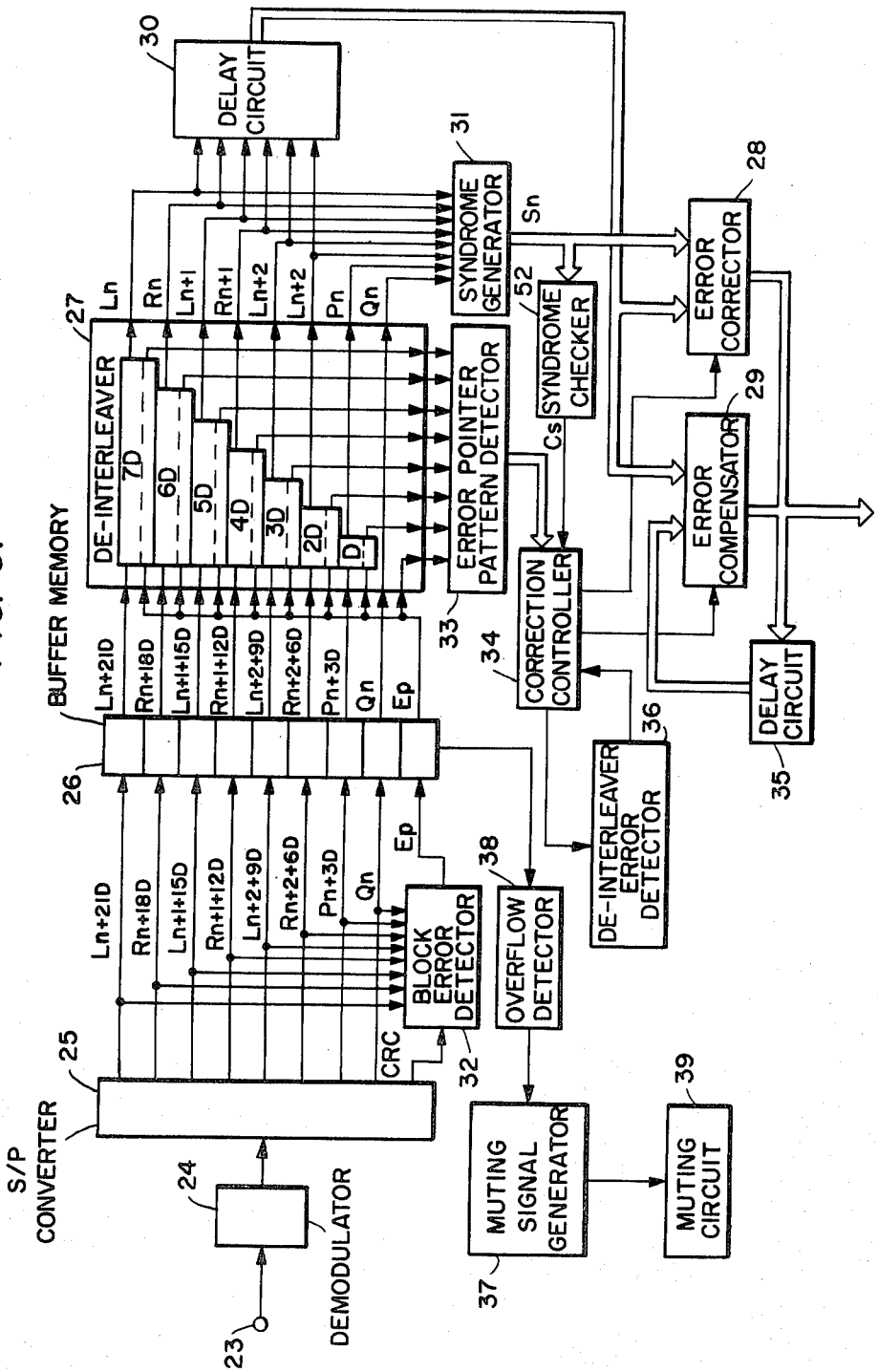
FIG. 6 shows a block diagram of a PCM signal decoder for restoring PCM signals from VTR format signals.

FIG. 6 is a block diagram of a PCM audio signal decoder. A detailed description of some of the elements may be found in AES (Audio Engineering Society) PREPRINT 1560 (G-5) for the 64th Convention (Nov. 2-5, 1979) in New York City. Modulated PCM audio signals reproduced from a VTR (not shown) are inputted through terminal 23 into TV signal demodulator 24. Demodulator 24 extracts and shapes the waveforms of the signals and forms a data block similar to the one in FIG. 1.

The data block from demodulator 24 is then applied to S/P converter 25 which divides the the data block into individual PCM words: $L_{n+21D}$, $R_{n+18D}$, $L_{n+1+15D}$, $R_{n+1+12D}$, $L_{n+2+9D}$, $R_{n+2+6D}$, $P_{n+3D}$, $Q_n$ and CRC. Received signals $L_{n+21D}$ through $Q_n$ have the same relative timing as encoded signals $L_n$ through $Q_{n-21D}$ shown in FIG. 5. The only difference is that the encoded signals are referenced to $L_n$ while the received signals are referenced to $Q_n$.

The PCM words are outputted from nine parallel output terminals and all except the CRC word are stored in buffer memory 26. Buffer memory 26 timeexpands the PCM words and compensates any jitters in the PCM words.

The six data words from buffer memory 26, $L_{n+21D}$ through $R_{n+2+6D}$, as well as the two check words, $P_{n+3D}$ and $Q_n$, are applied to de-interleave circuit 27. De-interleave circuit 27 comprises delay circuits through which seven words $L_{n+21D}$, $R_{n+18D}$, $L_{n+1+15D}$, $R_{n+1+12D}$, $L_{n+2+9D}$, $R_{n+2+6D}$, and $P_{n+3D}$ are delayed by different amounts, 7D through D, respectively. Check word $Q_n$ is not delayed. The output of de-interleave circuit 27 contains the data words in parallel and in the order that they appeared at the input terminals of interleave circuit 17 in FIG. 5: $L_n$, $R_n$, $L_{n+1}$, $R_{n+1}$, $L_{n+1}$, $R_{n+2}$, $P_n$, $Q_n$.

Data words $L_n$, $R_n$, $L_{n+1}$, $R_{n+1}$, $L_{n+2}$, and $R_{n+2}$ are outputted from de-interleave circuit 27 to both error corrector 28 and error compensator 29 through one-block delay circuit 30. Also from de-interleave circuit 27, data words $L_n$ through $R_{n+2}$, together with check words $P_n$ and $Q_n$, are inputted to syndrome generator 31 which generates a syndrome word $S_n$ from words $L_n$ through $Q_n$. Syndrome word $S_n$ checks for errors in words $L_n$ through $Q_n$ and is applied to error corrector 28 to correct any errors in data words $L_n$ through $R_{n+2}$. $S_n$ is also sent to syndrome checker 52 which generates a syndrome check signal, $C_s$. $C_s$ is a "1" when $S_n$ indicates that one or more errors exist in signals $L_n$ through $Q_n$.

The six data words from S/P converter 25, $L_{n+21D}$, $R_{n+18D}$, $L_{n+1+15D}$, $R_{n+1+12D}$, $L_{n+2+9D}$ and $R_{n+2+6D}$, plus the two block error correction check words, $P_{n+3D}$ and $Q_n$, are also inputted to block error detector 32 together with error detection check word CRC. Based on the CRC check word, error detector 32 generates an error pointer Ep for every word $L_{n+21D}$ through $Q_n$. Error pointer Ep comprises data word error pointers $Ep_{Ln+21D}$ through $Ep_{Qn}$ corresponding to words $L_{n+21D}$ through $Q_n$.

Ep passes through buffer memory 26 and de-interleave circuit 27 into error pointer pattern detector 33. De-interleave circuit 27 processes Ep with the PCM word with which pointers $Ep_{Ln+21D}$ through $Ep_{Qn}$ correspond. Thus, the error pointer for data word $L_n$, $Ep_{Ln}$, is applied to error pointer pattern detector 33 from de-interleave circuit 27 at the same time that data word $L_n$ is outputted from de-interleave circuit 27. Similarly, error pointer for data word $R_n$, $Ep_{Rn}$, is applied to error pointer pattern detector 33 when data word $R_n$ is outputted from de-interleave circuit 27, and the same process holds true for the other data words. On the basis of error pointers $Ep_{Ln}$ through $Ep_{Qn}$, an error pointer pattern detector 33 detects any errors occurring in a PCM word.

The output of error pointer pattern detector 33 is sent to correction controller 34 together with syndrome check signal $C_s$. The outputs of correction controller 34 are connected to the control terminals of error corrector 28 and error compensator 29. The purpose of correction controller 34 is to control the operation of error corrector 28 and error compensator 29.

Any errors in data words $L_n$ through $R_{n+2}$ (from one-block delay circuit 30) are corrected by error corrector 28 using syndrome word $S_n$. If, however, there are too many errors, error corrector 28 cannot make the correction, so the erroneous data words are compensated by error compensator 29 using bits from corresponding words from the previously received data block. These bits are available through one-block delay circuit 35.

An output of correction controller 34 is connected to de-interleave error detector 36. De-interleave error detector 36 checks the signals from controller 34 to determine whether de-interleave circuit 27 has malfunctioned. Detector 36 sends this determination back to correction controller 34. Correction controller 34 then uses that determination to control error compensator 29 when there is any de-interleaving at de-interleave circuit 27.

Overflow detector 38 detects an overflow of buffer memory 26. The output of overflow detector 38 feeds an input terminal of muting signal generator 37. The muting signal generated by muting signal generator 37 is sent to muting circuit 39 where, under the control of the muting signal, erroneous bits are muted into a logic "0."

The PCM audio signal decoder shown in FIG. 6 has several limitations. First, de-interleaver circuit 27 needs a large memory capacity to delay the error pointer Ep as well as words $L_{n+21D}$ through $P_{n+3D}$. Second, generally 4-bit RAMs (random access memories) or 8-bit RAMs are used for de-interleave circuit 27. If the circuit is being used with 16-bit data words, however, those words would also have an added error pointer bit Ep so there would in fact be 17-bit words in the de-interleave circuit. As a result, many RAMs are needed for storage in de-interleave circuit 27 and many of the RAMs are not used efficiently.

Figure 7:
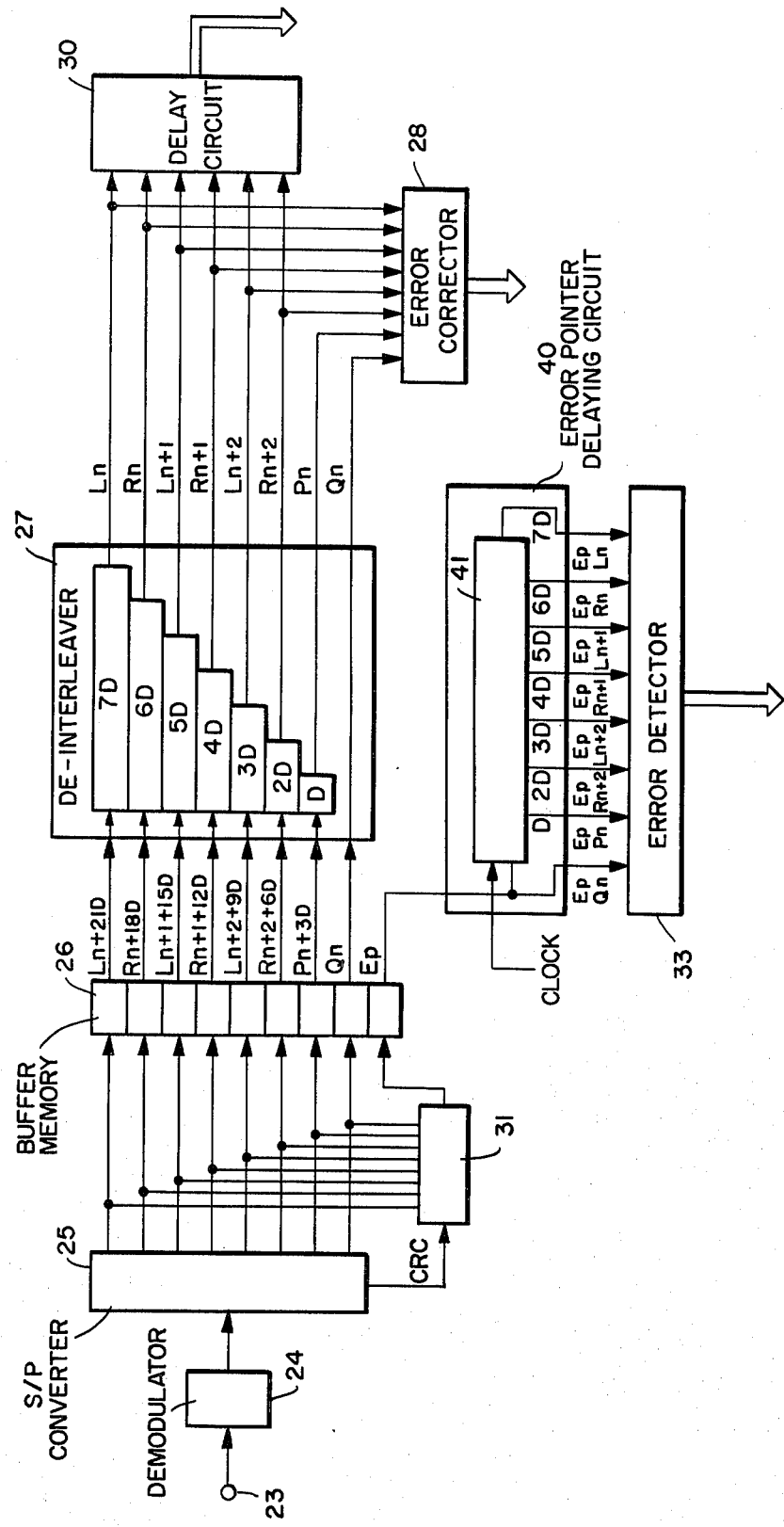
FIG. 7 shows a block diagram for one embodiment of a PCM signal processor according to the present invention.

FIG. 7 contains a block diagram of one embodiment of a PCM audio signal decoder of the present invention. This decoder comprises many of the same circuits contained in the prior art PCM audio signal detector shown in FIG. 6. One major difference is shift register 41 in the error pointer pattern detector 33 of the embodiment in FIG. 7. Another difference is the connection between detector 33 and delay circuit 30. These differences will be described below in detail, but the circuits in FIG. 7 which are the same as those in FIG. 6 will not be described again.

In FIG. 7, error pointer Ep, generated by block error detector 31, is applied, through buffer 26, to error pointer pattern detector 33. In detector 33, error pointer Ep is inputted to a seven-stage serial shift register 41 whose clock or shift pulse has a frequency of 1/D. Each stage of the shift register 41 effects a delay D to the data at its input and each stage has a separate output. Thus, shift register 41 is capable of imparting delays from D to 7D to signals at its input.

By inputting the error pointer Ep into register 41, the outputs of shift register 41 contain the specific error pointers delayed by the appropriate periods of time. The error pointer for data word $L_n$, $Ep_{Ln}$, is applied to error pointer pattern detector 33 from the seventh output terminal of shift register 41 when data word $L_n$ is outputted from de-interleave circuit 27. Similarly, the error pointer for data word $R_n$, $Ep_{Rn}$, is applied to error pointer pattern detector 33 from the sixth output terminal of shift register 41 when data word $R_n$ is outputted from de-interleave circuit 27. The rest of the error pointers are also synchronized with their corresponding data words in this manner. The error pointer for check word $Q_n$, $Ep_{Qn}$, is directly applied to error pointer pattern detector 33 because $Q_n$ is not delayed by de-interleaver 27, so $Ep_{Qn}$ does not have to be delayed.

Another embodiment of the delay means for the error pointer Ep is shown in FIG. 8. The delay means includes a parallel type register 42 containing seven register units. The gate signals for each register have a frequency of 1/D, so each register unit delays its input signal by time D.

In FIG. 8, error pointer Ep is applied to error pointer pattern detector 33 (not shown) via terminal 43 as well as to input $IN_1$ of first delay unit. Error pointer $Ep_{Pn}$ on output $OUT_1$ of the first register unit is applied to error pointer pattern detector 33 via terminal 44 as well as to input $IN_2$ of the second register unit. Similarly, the error pointers on outputs $OUT_2$ through $OUT_6$ of the second through the sixth units are applied to error pointer pattern detector 33 via terminals 45 through 49, respectively, as well as to inputs $IN_3$ through $IN_7$, respectively, of the register 42. Error pointer Ep on output $OUT_7$ of the seventh unit is applied to error pointer pattern detector 33 via terminal 50.

In this manner, error pointers $Ep_{Ln}$, $Ep_{Rn}$, $Ep_{Ln+1}$, $Ep_{Rn+1}$, $Ep_{Ln+2}$, $Ep_{Rn+2}$, $Ep_{Pn}$ and $Ep_{Qn}$ for respective words $L_n$, $R_n$, $L_{n+1}$, $R_{n+1}$, $L_{n+2}$, $R_{n+2}$ and $Q_n$ are obtained on terminals 50 through 43 at the same time that their corresponding data words appear at the inputs of de-interleaver 27.

This invention thus greatly simplifies and reduces the cost of a PCM decoder by reducing the amount of storage necessary in de-interleave circuits.

It will be apparent to those skilled in the art that various modifications and variations can be made in the PCM signal processor of this invention. It is intended that the present invention cover the modifications and variations of this invention provided that they come within the scope of the appended claims and their equivalents.

What is claimed is:

1. A pulse code modulation (PCM) signal processor for extracting data words from a serial PCM data block also containing an error detection and correction code, said signal processor comprising:

serial-to-parallel converter means for converting said serial PCM data block into a parallel format, said serial-to-parallel converting means having terminals each outputting in parallel a different one of said data words and said error detection and correction code;

de-interleave means conneected to said terminals of said serial-to-parallel converter means for adding different delays to said data words such that all of said data words appear synchronously at the output of said de-interleave means;

means connected to said terminals of said serial-to-parallel converter means for forming an error pointer from said data words and said error detection and correction code, said error pointer comprising data word error pointers each indicating the presence of an error in a different one of said data words;

an error pointer shift register connected to said error pointer forming means for synchronizing said error pointer with said de-interleave means such that each data word error pointer is synchronized with its corresponding data word; and means connected to said error pointer shift register and to said de-interleave means for detecting and correcting errors in said data words from said de-interleave means using said data word error pointers from said error pointer shift register.

2. A pulse code modulation (PCM) signal processor for extracting data words from a serial PCM data block also containing an error detection and correction code, said signal processor comprising:

serial-to-parallel converter means for converting said serial PCM data block into a parallel format, said serial-to-parallel converting means having terminals each outputting in parallel a different one of said data words and said error detection and correction code;

de-interleave means connected to said terminals of said serial-to-parallel converter means for adding different delays to said data words such that all of said data words appear synchronously at the output of said de-interleave means, said de-interleave means containing means to impart no delay to a last data word occurring later than the other data words in said serial PCM data block and adding a delay iD to the data words other than said last data word, where D is a time required to transmit one data word in said PCM data block and where i is an integer indicating the number of data word positions of a particular data word from said last data word;

means connected to said terminals of said serial-to-parallel converter means for forming an error pointer from said data words and said error detection and correction code, said error pointer comprising data word error pointers each indicating the presence of an error in a different one of said data words;

an error pointer shift register connected to said error pointer forming means for synchronizing said error pointer with said de-interleave means such that each data word error pointer is synchronized with its corresponding data word, said error pointer shift register including means to shift said error pointer at a rate equal to 1/D; and means connected to said error pointer shift register to said de-interleave means for detecting and correcting errors in said data words from said de-interleave means using said data word error pointers from said error pointer shift register.

3. The PCM signal processor in claim 2 wherein said error pointer shift register comprises a serial shift register including a number of independent stages, said number of stages being equal to one less than the number of data words in sad PCM data block, each of said stages having a separate output and imparting the same preset delay to the signal at its input.

4. The PCM signal processor in claim 2 wherein said error pointer shift register includes a number of storage registers, said number of registers being one less than the number of data words in said PCM data block, each of said registers having an input and an output, the output of a register being connected to the input of a succeeding register and each of said registers imparting the same preset delay to the signal at its input.

5. A pulse code modulation (PCM) signal processor for extracting data words from a serial PCM data block also containing an error detection and correction code, said signal processor comprising:

serial-to-parallel converter means for converting said serial PCM data block into a parallel format, said serial-to-parallel converting means having terminals each outputting in parallel a different one of said data words in said error detection and correction code;

de-interleave means connected to said terminals of said serial-to-parallel converter means for adding different delays to said data words such that all of said data words appear synchronously at the output of de-interleave means;

means connected to said terminals of said serial-to-parallel converter means for forming an error pointer from said data words and said error detection and correction code, said error pointer comprising data word error pointers each indicating the presence of an error in a different one of said data words;

an error pointer shift register connected to said error pointer forming means for synchronizing said error pointer with said de-interleave means such that each data word error pointer is synchronized with its corresponding data word, said error pointer shift register including a serial shift register having a number of indpendent stages, said number of stages being equal to one less than the number of data words in said PCM data block and each of said stages having a separate output and imparting the same preset delay to the signal at its input; and means connected to said error pointer shift register and to said de-interleave means for detecting and correcting errors in said data words from said de-interleave means using said data word error pointers from said error pointer shift register.

6. A pulse code modulation (PCM) signal processor for extracting data words from a serial PCM data block also containing an error detection and correction code, said signal processor comprising:

serial-to-parallel converter means for converting said serial PCM data block into a parallel format, said serial-to-parallel converting means having terminals each outputting in parallel a different one of said data words and said error detection and correction code;

de-interleave means connected to said terminals of said serial-to-parallel converter means for adding different delays to said data words such that all of said data words appear synchronously at the output of said de-interleave means;

means connected to said terminals of said serial-to-parallel converter means for forming an error pointer from said data words and said error detection and correction code, said error pointer comprising data word error pointers each indicating a presence of an error in a different one of said data words;

an error pointer shift register connected to said error pointer forming means for synchronizing said error pointer with said de-interleave means such that each data word error pointer is synchronized with its corresponding data word, said error pointer shift register including a number of storage registers, said number of registers being one less than the number of data words in said PCM data block and each of said registers having an input and an output, the output of a register being connected to the input of a succeeding register and each of said registers imparting the same preset delay to the signal at its input; and means connected to said error pointer shift register and to said de-interleave means for detecting and correcting errors in said data words from said de-interleave means using said data word error pointers from said error pointer shift register.

* * * * *